United States Patent
Huang

(10) Patent No.: US 11,526,013 B2
(45) Date of Patent: Dec. 13, 2022

(54) WEARABLE DISPLAY DEVICE

(71) Applicant: Acer Incorporated, New Taipei (TW)

(72) Inventor: Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 293 days.

(21) Appl. No.: 16/845,203

(22) Filed: Apr. 10, 2020

(65) Prior Publication Data

US 2021/0199966 A1    Jul. 1, 2021

(30) Foreign Application Priority Data

Dec. 30, 2019    (TW) ................................. 108148310

(51) Int. Cl.
| | | |
|---|---|---|
| *G02B 27/01* | (2006.01) | |
| *F21V 8/00* | (2006.01) | |
| *G02F 1/137* | (2006.01) | |
| *G02F 1/1334* | (2006.01) | |

(52) U.S. Cl.
CPC ......... *G02B 27/0172* (2013.01); *G02B 6/005* (2013.01); *G02B 6/0026* (2013.01); *G02F 1/137* (2013.01); *G02F 1/1334* (2013.01)

(58) Field of Classification Search
CPC .. G02B 27/0172; G02B 6/0026; G02B 6/005; G02F 1/1334; G02F 1/137
USPC ........................................................ 359/630
See application file for complete search history.

(56) References Cited

U.S. PATENT DOCUMENTS

| 10,627,565 | B1* | 4/2020 | Trail ..................... | G02B 6/0016 |
|---|---|---|---|---|
| 2015/0248011 | A1* | 9/2015 | Schowengerdt ... | G02B 27/0087 |
| | | | | 359/566 |
| 2017/0108697 | A1 | 4/2017 | El-Ghoroury et al. | |
| 2017/0285347 | A1 | 10/2017 | Gai et al. | |
| 2020/0174298 | A1* | 6/2020 | Davis .................. | G02F 1/13318 |

(Continued)

FOREIGN PATENT DOCUMENTS

| CN | 105629474 A | * | 6/2016 | ............. G02B 27/01 |
|---|---|---|---|---|
| CN | 105629474 A | | 6/2016 | |
| CN | 108803023 A | * | 11/2018 | ......... G02B 27/0172 |

(Continued)

OTHER PUBLICATIONS

Chinese language office action dated Jun. 11, 2020, issued in application No. TW 108148310.

*Primary Examiner* — Collin X Beatty

(74) *Attorney, Agent, or Firm* — McClure, Qualey & Rodack, LLP

(57) ABSTRACT

A wearable display device is provided, including a first optical waveguide lens and a first projection assembly. The first optical waveguide lens has a first area and a second area. The first projection assembly disposed on the first optical waveguide lens projects a plurality of lights and includes a first light projector and a second light projector. The first and second light projectors are disposed in different positions on the first optical waveguide lens in the first direction, and the first light projector and the second light projector do not overlap in the second direction, wherein the first direction and the second direction are not parallel. The first light projector projects a first light to the first area, and the second light projector projects a second light to the second area, and the first light does not overlap with the second light in the second direction.

12 Claims, 10 Drawing Sheets

(56) References Cited

U.S. PATENT DOCUMENTS

2020/0183152 A1\* 6/2020 Pennell ................ G02B 27/141
2020/0292819 A1\* 9/2020 Danziger ............. G02B 6/0028

FOREIGN PATENT DOCUMENTS

| CN | 108803023 A | | 11/2018 | |
|----|-------------|---|---------|---|
| CN | 209858861 U | \* | 12/2019 | |
| CN | 209858861 U | | 12/2019 | |
| TW | 201728961 A | | 8/2017 | |
| WO | WO-2017102795 A1 | \* | 6/2017 | ......... G02B 27/0172 |

\* cited by examiner

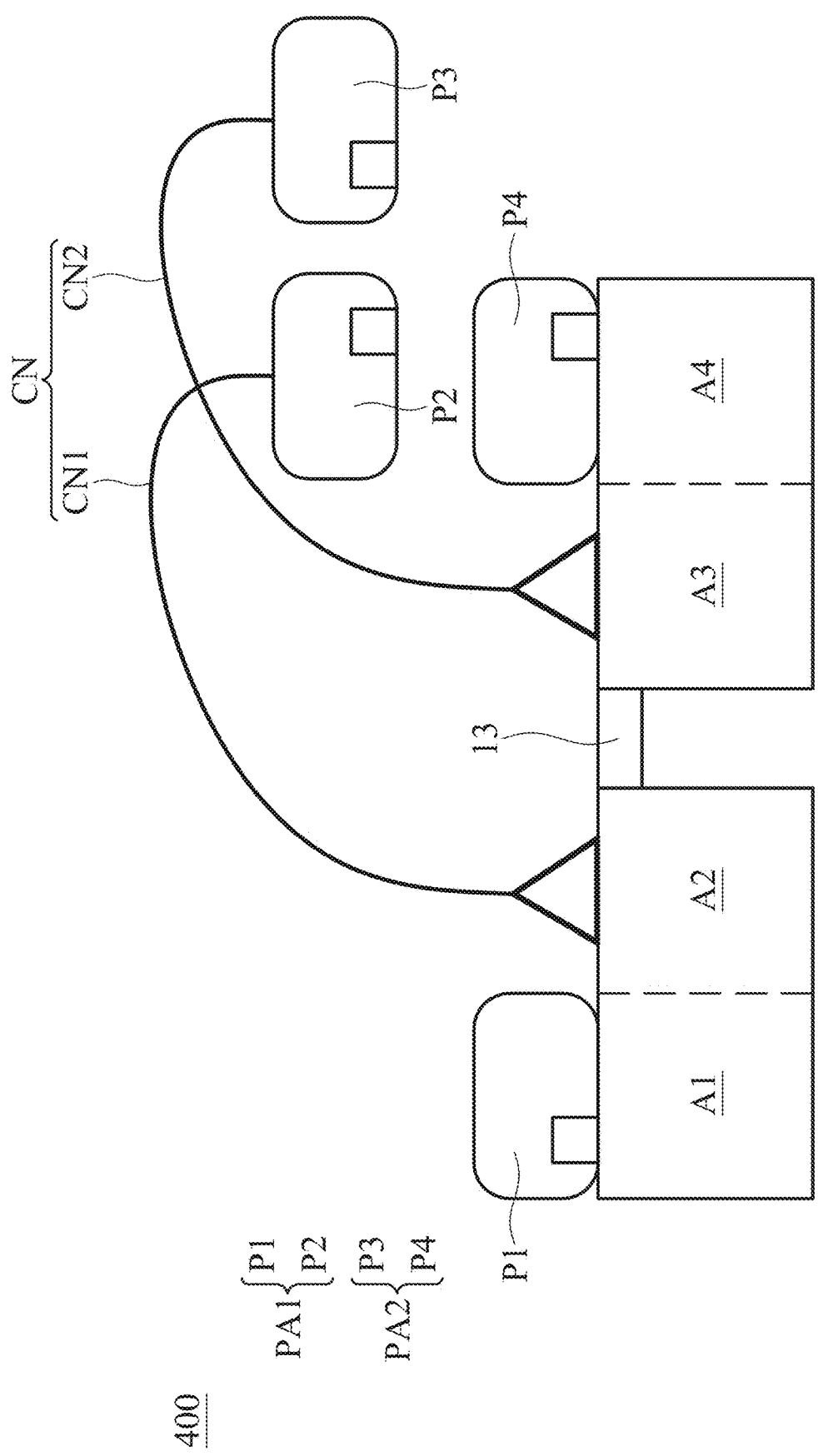

WEARABLE DISPLAY DEVICE

CROSS REFERENCE TO RELATED APPLICATIONS

This application claims the benefit of Taiwan Application No. 108148310, filed on Dec. 30, 2019, the entirety of which is incorporated by reference herein.

BACKGROUND OF THE INVENTION

Field of the Invention

The application relates in general to a wearable display device, and in particular to a wearable display device with optical projector and optical waveguide lens.

Description of the Related Art

Thanks to ongoing technological developments, technology for displaying images is becoming increasingly advanced. For example, virtual reality (VR) display devices and augmented reality (AR) display devices have appeared on the market to provide consumers with a richer and more colorful visual experience. To meet consumer demand for high performance and miniaturization, wearable display devices must be made thinner and lighter. In addition, the viewing angle provided by the display device, and its size and volume, are also important factors affecting user experience. For this reason, how to provide a high-quality, high pixel density electronic product with a wide viewing angle has become an important issue.

BRIEF SUMMARY OF INVENTION

To address the deficiencies of conventional products, an embodiment of the invention provides a wearable display device, including a first optical waveguide lens and a first projection assembly. The first optical waveguide lens has a first area and a second area. The first projection assembly disposed on the first optical waveguide lens for projecting a plurality of lights and includes a first light projector and a second light projector. The first light projector and the second light projector are disposed in different positions on the first optical waveguide lens in the first direction, and the first light projector and the second light projector do not overlap in the second direction, wherein the first direction and the second direction are not parallel. The first light projector projects a first light to the first area, and the second light projector projects a second light to the second area, and the first light does not overlap with the second light in the second direction.

In some embodiments, the wearable display device further comprises: a second optical waveguide lens, adjacent to the first optical waveguide lens, and having a third area and a fourth area; and a second projection assembly, disposed on the second optical waveguide lens and including a third light projector and a fourth light projector; wherein the third light projector and the fourth light projector are respectively disposed in different positions of the second optical waveguide lens in the first direction, and the third light projector and the fourth light projector do not overlap in the second direction; wherein the third light projector projects a third light to the third area, the second light projector projects a fourth light to the fourth area, and the third light and the fourth light do not overlap in the second direction.

In some embodiments, the first projection assembly further includes a third light projector, and the first optical waveguide lens further includes a third area, wherein the third light projector projects a third light to the third area, and the first, second, and third lights do not overlap each other in the second direction.

In some embodiments, the wearable display further comprises a connecting line assembly disposed on the first optical waveguide lens, and the connecting line assembly connects the first optical waveguide lens and the second light projector.

In some embodiments, the wearable display further comprises an optical component disposed on the first optical waveguide lens, wherein when the lights are emitted from the first projection assembly to the first optical waveguide lens, the light is reflected or diffracted via the optical element in the first optical waveguide lens.

In some embodiments, the optical component is inclined relative to the surface of the first optical waveguide lens.

In some embodiments, the wearable display further comprises an optical element disposed on a side of the first optical waveguide lens, wherein when the plurality of lights emitted by the first projection assembly sequentially pass through the first waveguide lens and the optical element, the optical element enables each light to have a viewing angle on the optical element, and the lights overlap each other.

In some embodiments, the wearable display further comprises a virtual reality lens and a goggle shield, the virtual reality lens is disposed on a side of the first waveguide lens, and the virtual reality lens, the first waveguide lens and the first light projection assembly are disposed in the goggle shield.

In some embodiments, the visual area of the goggle shield has an opaque material.

In some embodiments, the visual area of the goggle shield has a polymer dispersed liquid-crystal material, and the goggle shield can be switched between a power-off mode and a power-on mode, wherein when the goggle shield is in the power-off mode, the visual area presents a matte surface, and when the goggle shield is in the power-on mode, the visual area presents a transparent surface.

BRIEF DESCRIPTION OF DRAWINGS

The invention can be more fully understood by reading the subsequent detailed description and examples with references made to the accompanying drawings, wherein:

FIG. 4 is a schematic diagram of a wearable display device according to another embodiment of the present invention.

DETAILED DESCRIPTION OF INVENTION

The making and using of the embodiments of the devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Embodiment 1

Figure 1A:
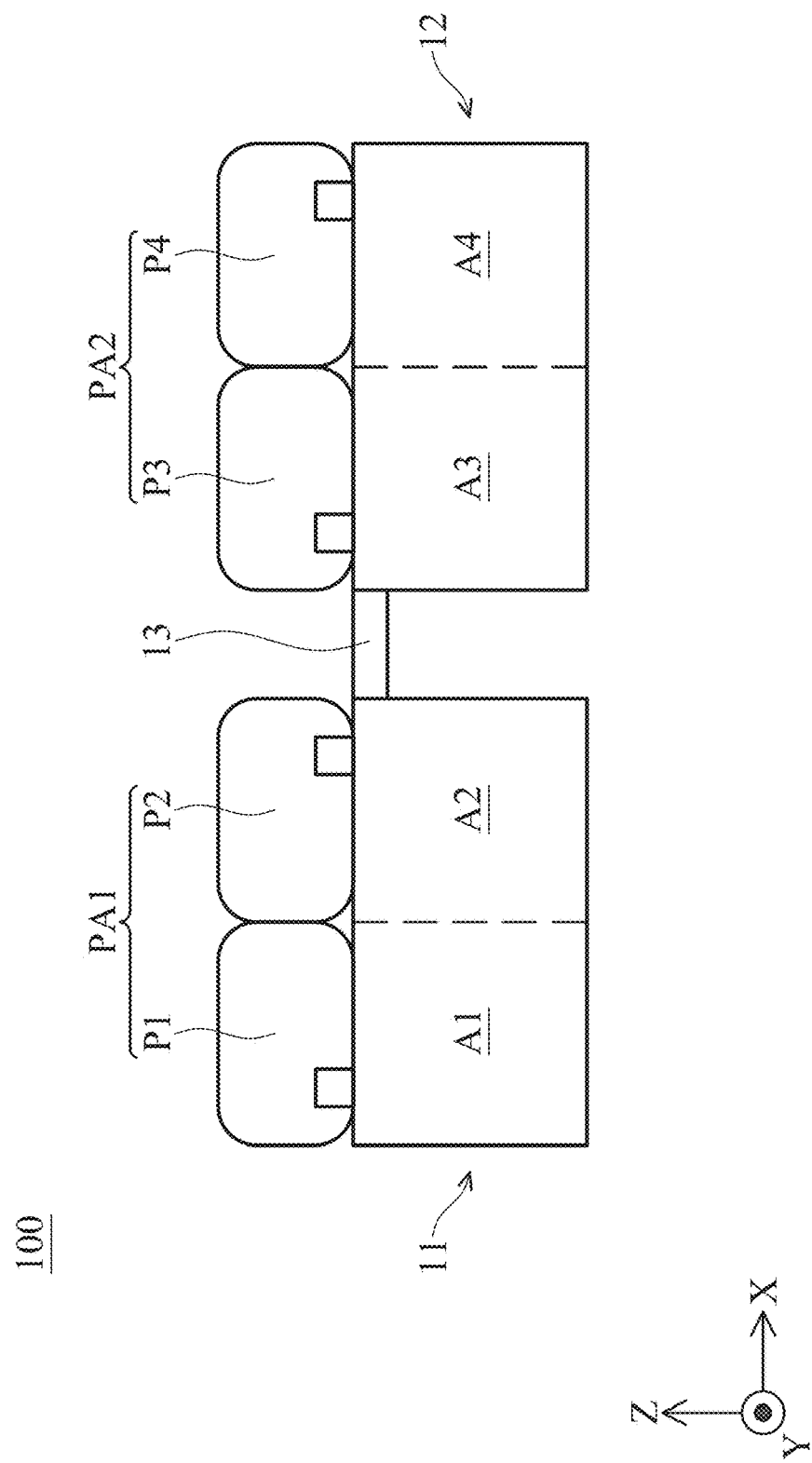
FIG. 1A is a schematic diagram of a wearable display device according to an embodiment of the present invention.

Please refer to FIG. 1A, which is a schematic diagram illustrating a wearable display device 100 according to an embodiment of the present invention. As shown in FIG. 1, the wearable display device 100 can be used as an augmented reality (AR) wearable display device, which includes a first optical waveguide lens 11, a second optical waveguide lens 12, and a first projection assembly PA1 and a second projection assembly PA2. The first optical waveguide lens 11 and the second optical waveguide lens 12 are adjacent to each other, and can be connected to each other through a frame 13, and correspond to the eyes E1 and E2 of a user, respectively. The first projection assembly PA1 and the second projection assembly PA2 are respectively disposed on the first optical waveguide lens 11 and the second optical waveguide lens 12, and are configured to project a plurality of light onto the first optical waveguide lens 11 and the second optical waveguide lens 12. These lights will pass through the first optical waveguide lens 11 and the second optical waveguide lens 12 to the user's eyes E1 and E2, so that the user can view the images on the first and second optical waveguide lenses 11, 12. Details of the wearable display device 100 will be described below.

Figure 1B:
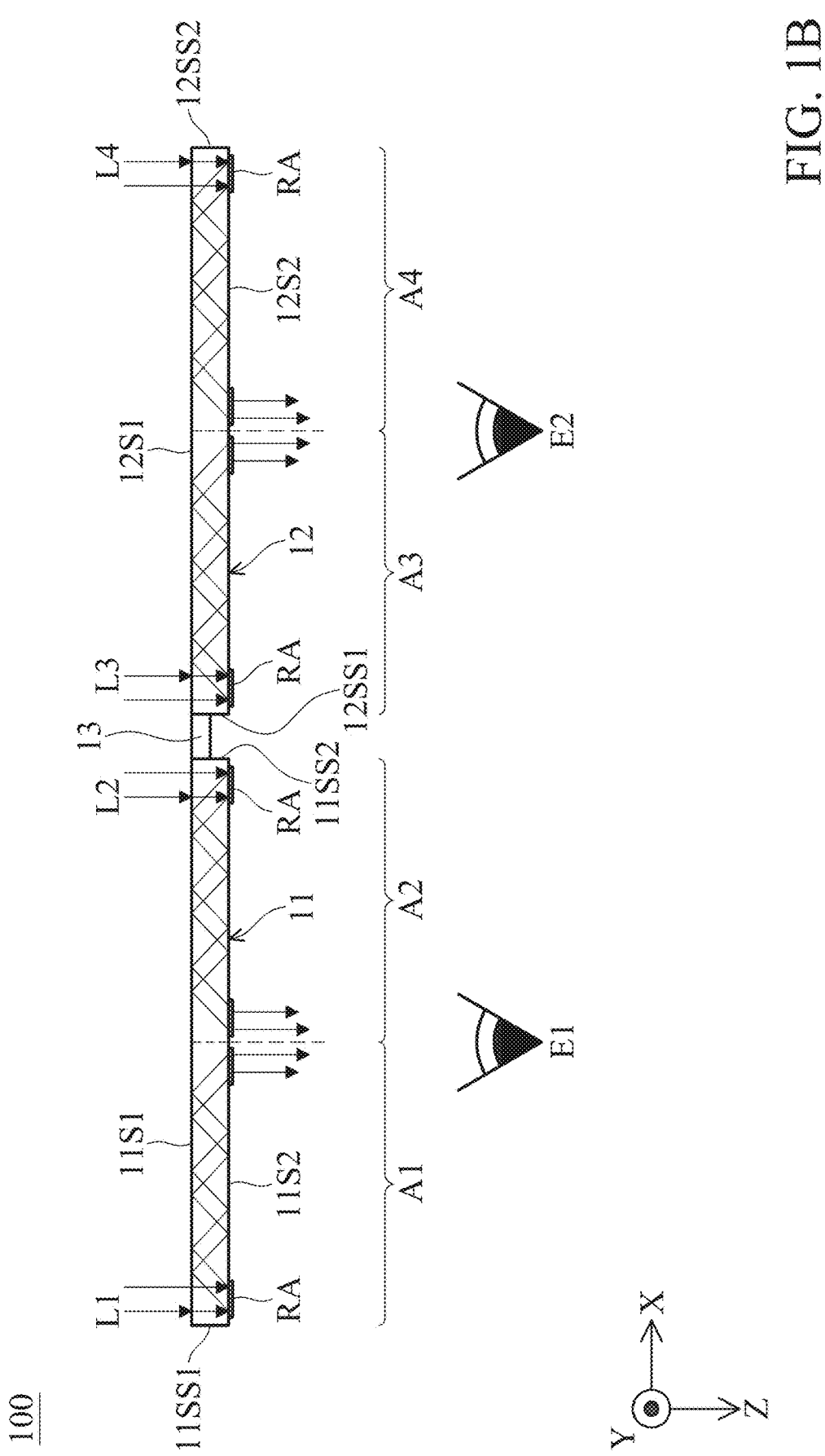
FIG. 1B is a schematic diagram of a plurality of light projector projecting a plurality of lights to the light waveguide lenses.

Please refer to FIGS. 1A and 1B together, where FIG. 1B is a schematic top view of the wearable display device 100 in FIG. 1A. The optical waveguide lens (11 or 12) has a transparent material and a thickness in the Y-axis. Lens 11 has a first side 11S1 and second side 11S2, and Lens 12 has a first side 12S1 and second side 12S2. The first and second projection assemblies PA1 and PA2 emit a plurality of lights and project them to the first and second optical waveguide lenses 11 and 12, wherein the lights enters from the first side 11S1 and 12S1 and exits from the second side 11S2 and 12S2, and then enter the eyes E1 and E2 of the user. The light emitted by the first and second projection assemblies PA1 and P2 may be a sub-frame image light beam.

Specifically, regarding the first optical waveguide lens 11 and the first projection assembly PA1, the first projection assembly PA1 includes a plurality of light projectors: a first light projector P1 and a second light projector P2. The two are respectively disposed on a first area A1 and a second area A2 of the first optical waveguide lens 11. The first light projector P1 projects a first light L1, the second light projector P2 projects a second light L2, and the lights enter from the first side 11S1 of the first optical waveguide lens 11, and then reflected or diffracted in the first optical waveguide lens 11 by an optical component RA, and is emitted from the second side 11S2 to enter the user's eyes E1, to provide augmented reality images. The first light projector P1 and the second light projector P2 are respectively disposed on the lateral sides of the first optical waveguide lens 11: the first lateral side 11SS1 and the second lateral side 11SS2, and the projectors P1, P2 are located at different positions along the X-axis (the first direction) of the optical waveguide lens 11. The projected first light L1 and the second light L2 projected by the optical waveguide lens 11 are respectively in the first area A1 and the second area A2, wherein the areas A1, A2 do not overlap each other along the Y-axis (the second direction).

Similarly, regarding the second optical waveguide lens 12 and the second projection assembly PA2, the second projection assembly PA2 includes a plurality of light projectors: a third light projector P3 and a fourth light projector P4, which are respectively disposed on the third and fourth areas A3 and A4 of the second optical waveguide lens 12. The third light projector P3 projects a third light L3, and the fourth light projector P4 projects a forth light L4. The lights L3 and L4 enter from the first side 12S1 of the second optical waveguide lens 12, and are reflected or diffracted in the second optical waveguide lens 12 by the optical component RA, and then exits from the second side 12S2 to enter the user's eye E2, so as to provide augmented reality images. The third light projector P3 and the fourth light projector P4 are respectively disposed on the sides of the second optical waveguide lens 12: the first lateral side 12SS1 and the second lateral side 12SS2. The third light L3 and the fourth light L4 projected by the projectors P3 and P4 are in the third area A3 and the fourth area A4, respectively, wherein the area A3, A4 do not overlap each other in the Y-axis. The first to fourth lights L1 to L4 projected from the respective first to fourth areas A1 to A4 can form a complete image to be provided to the eyes E1 and E2 of the user.

Furthermore, the aforementioned optical component RA may be a plurality of gratings, which are disposed in the first optical waveguide lens 11, and configured to reflect or diffract the lights L1 to L4 emitted by the light projectors P1 to P4, so that lights are reflected or diffracted in the first optical waveguide lens 11 and the second optical waveguide lens 12, and the lights L1 to L4 are out from the lenses 11 and 12 by the output gratings RA.

In this way, by providing projection assemblies PA1 and PA2 including a plurality of light projectors (such as P1 to P2 and P3 to P4) on each of the optical waveguide lenses 11, 12, the wearable display device 100 has a high pixel density, and can provide a wide field of view, greatly improve the quality of the device and enrich the viewing experience for users. In addition, each of the light projectors P1 to P4 can be independently controlled, for example, connected to a control unit in the wearable display device 100. The user can use control members (for example, control buttons on the appearance of the wearable display device 100) to activate these light projectors P1 to P4. For example, when the user wants to simultaneously observe the surrounding environment and to enable the projection image provided by the wearable display device 100, the first and second light projectors P1 and P2 can be turned on so that the first and second areas A1 and A2 on the first optical waveguide lens 11 display images; and the third and fourth light projectors P3 and P4 are closed (or turned off) so that the second optical waveguide lens 12 (areas A3 and A4) does not display images and the surrounding environment can be seen directly. As such, the wearable display device 100 provides a more flexible user experience.

Figure 1C:
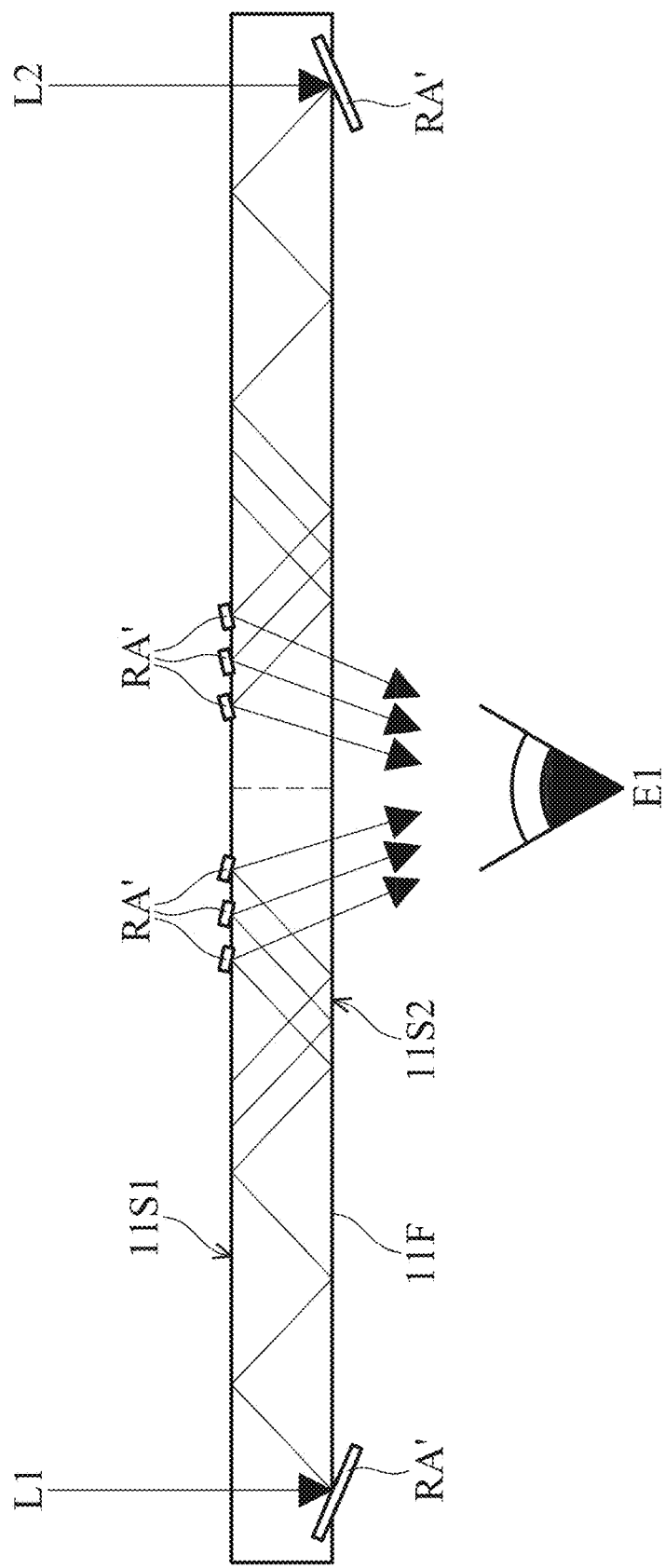
FIG. 1C is a schematic diagram of an optical assembly and a first waveguide lens according to another embodiment of the present invention.

FIG. 1C is a schematic diagram showing the structures of the first optical waveguide lens 11 and the optical component RA' according to another embodiment. In this embodiment, some of the grating of the optical components RA' are disposed on an output end of the first optical waveguide lens 11 and inclined with respect to a surface 11F of the first optical waveguide lens 11, so that the viewing angle of the first and second lights L1 and L2 output at different positions of the first optical waveguide lens 11 can be rotated to adjust the output angles of the first and second lights L1 and L2, and then the light beams are directed toward the user's eye E1. In some embodiments, the second optical waveguide lens 12 can also be equipped with the aforementioned tilted grating optical component RA'. Another optical components RA' are disposed on first optical waveguide lens 11. When the lights are emitted from the first projection assembly to the first optical waveguide lens, the lights are reflected or diffracted via the another optical component in the first optical waveguide lens. The another optical components RA' are inclined relative to the surface 11F of the first optical waveguide lens 11.

Figure 1D:
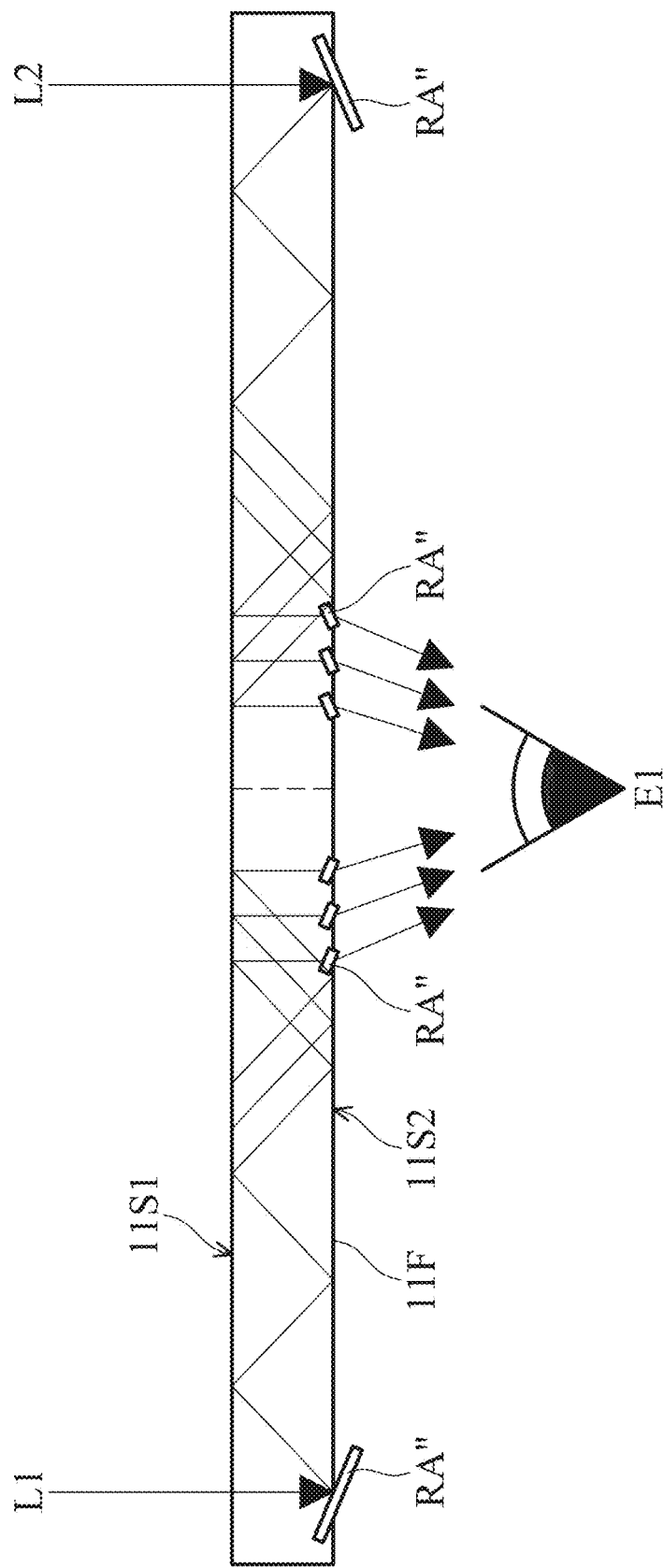
FIG. 1D is a schematic diagram of an optical assembly and a first waveguide lens according to another embodiment of the present invention.

FIG. 1D is a schematic diagram showing the structures of the first optical waveguide lens 11 and the optical component RA" according to another embodiment. In this embodiment, each grating of the optical component RA" is inclined with respect to a surface 11F of the first optical waveguide lens 11, and the first and second lights L1 and L2 are reflected or diffracted in the first optical waveguide lens 11. The output optical component RA" can be set on the second side 11S2, so that the viewing angles of the first and second lights L1 and L2 at different positions of the first optical waveguide lens 11 can be rotated, to adjust the output angle of the first and second lights L1, L2.

Second Embodiment

Figure 2:
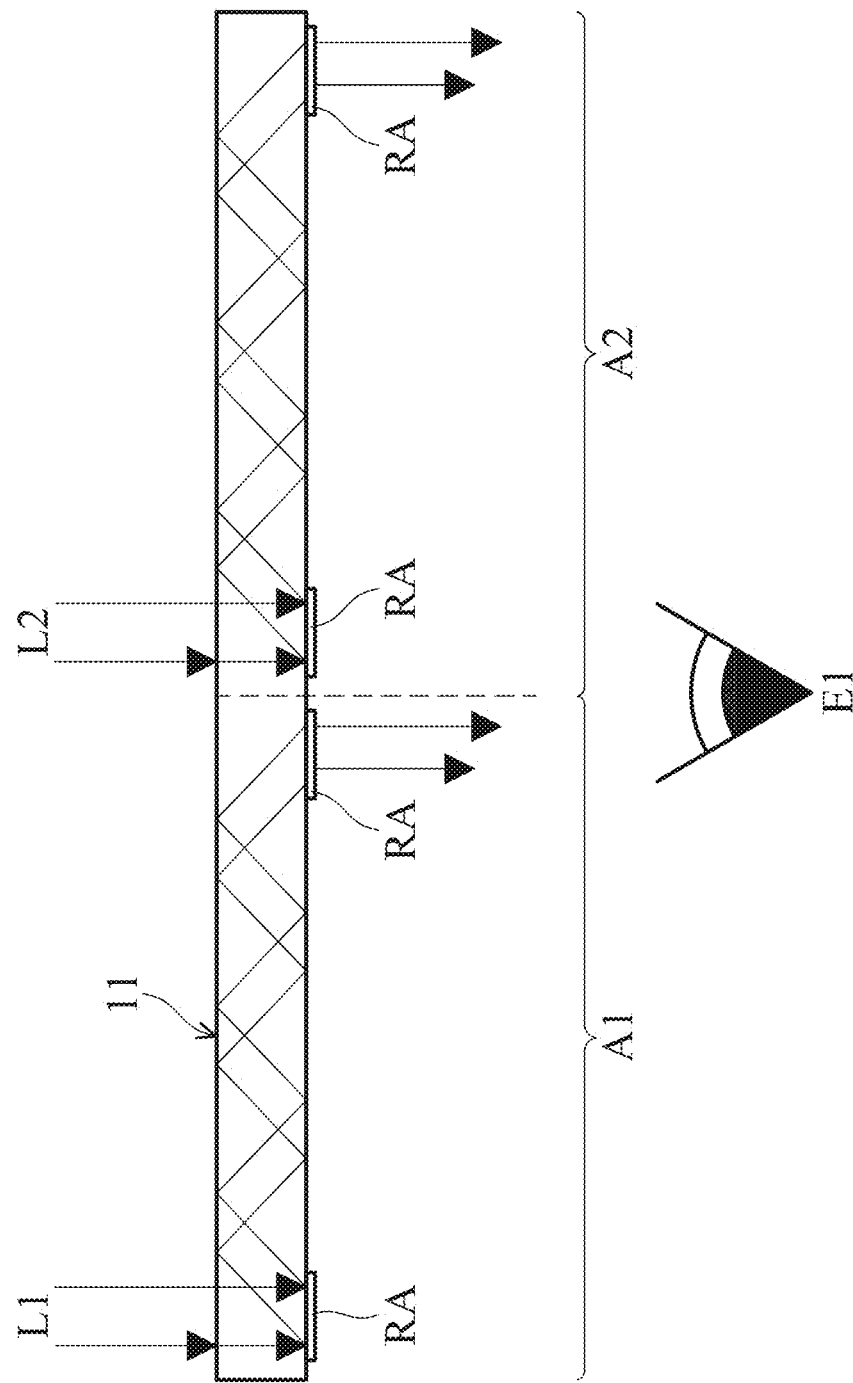
FIG. 2 is a schematic diagram showing the plurality of lights emitted by the first projection assembly and the first optical waveguide lens according to another embodiment of the present invention.

Referring to FIG. 2, a configuration of a first optical waveguide lens 11 and a first projection assembly PA1 according to another embodiment of the present invention is shown. Compared with the embodiment in FIG. 1B, the second light projector P2 in this embodiment is disposed on the second area A2 and adjacent to the first area A1 and does not overlap the first area A1. The second light projector P2 emits the second light L2 also in the second area A2 and does not overlap the first area A1. Through the above configuration of the first projection assembly PA1, it also has a high pixel density and a wide field of view. In some embodiments, the second projection assembly PA2 is also the same or symmetrical configuration as the first projection assembly PA1 in FIG. 2.

Third Embodiment

Figure 3:
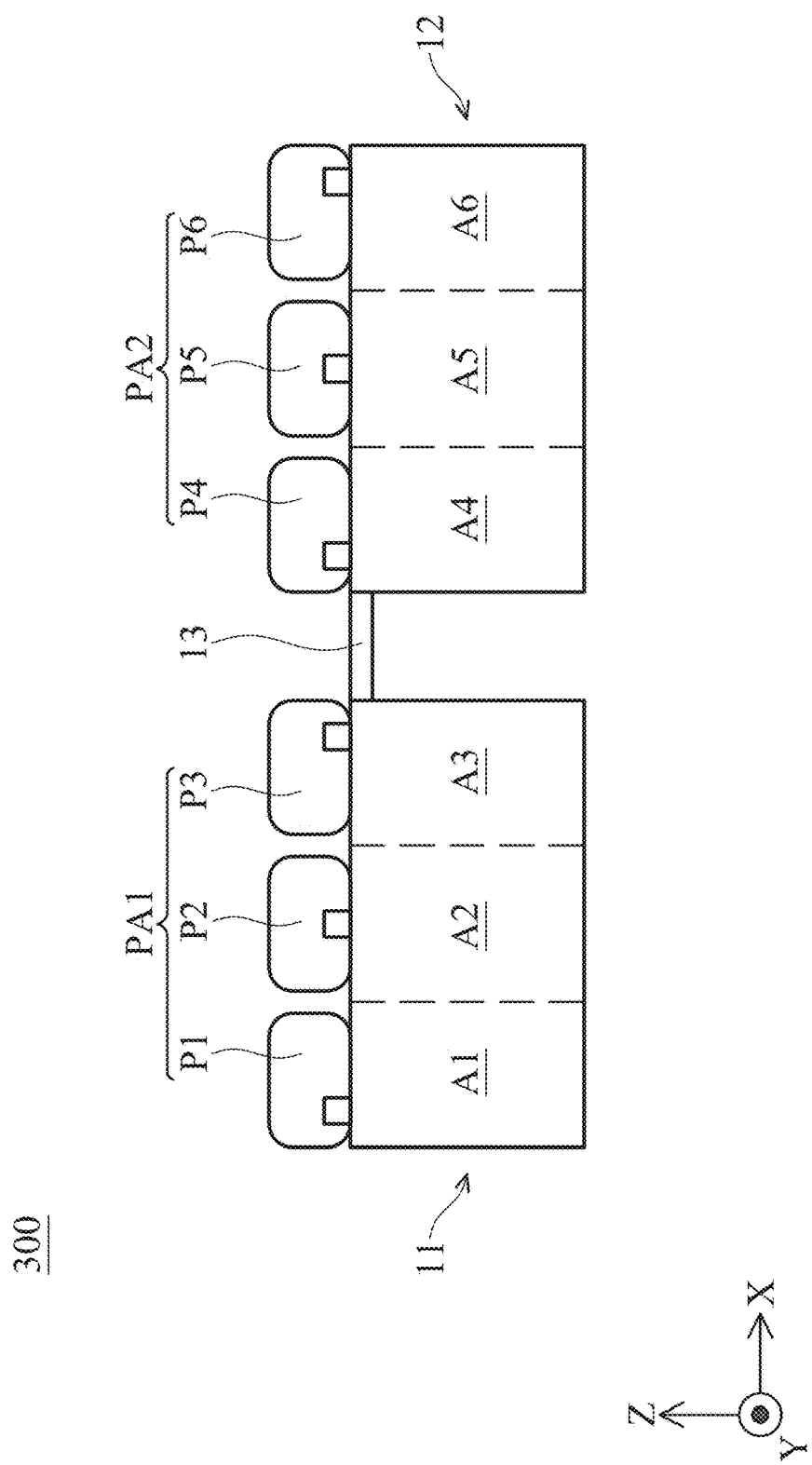
FIG. 3 is a schematic diagram of a wearable display device according to another embodiment of the present invention.

FIG. 3 is a schematic diagram showing first and second projection assemblies PA1 and PA2 and first and second optical waveguide lenses 11 and 12 according to another embodiment of the present invention. Compared with the projection assemblies in the first embodiment (FIG. 1), the projection assemblies PA1, PA2 in this embodiment has more light projectors corresponding to a single optical waveguide lens 11, 12: first to third light projectors P1~P3 and fourth to sixth light projectors P4~P6. That is, each light waveguide lens corresponds to three light projectors. The first optical waveguide lens 11 can be divided into three areas: first to third areas A1 to A3, respectively corresponding to the first to third light projectors P1 to P3, and the lights emitted by these light projectors P1 to P3 do not overlap in the Y-axis. The lights emitted by the fourth to sixth light projectors P4 to P6 on the fourth to sixth areas A4 to A6 of the second optical waveguide lens 12 also do not overlap each other in the Y-axis. In this way, the pixel density of the device can be increased further. In other embodiments, four, five, or another appropriate number of light projectors may be formed on each optical waveguide lens, and projected on the corresponding divided areas on the optical waveguide lenses.

Fourth Embodiment

FIG. 4 shows a wearable display device 400 according to another embodiment of the present invention. Compared with the wearable display device 100 of the first embodiment, the wearable display device 400 further includes a connecting line assembly CN, which is disposed on the first optical waveguide lens 11 and the second optical waveguide lens 12. In detail, the connecting line assembly CN includes a first connecting line CN1 and a second connecting line CN2. The first connecting line CN1 connects the upper side of the first optical waveguide lens 11 and the second projection assembly PA2, and the second connecting line CN2 connects the upper side of the second optical waveguide lens 11 and the third projection assembly P3. In this way, through the connecting line assembly CN, a part of the light projectors P2 and P3 need not be provided on the first optical waveguide lens 11 and the second optical waveguide lens 12, so that when the user uses the wearable display device 400, The wearing weight is reduced and the convenience is improved, and the second light projector P2 and the third light projector P3 connected through the connecting line assembly CN can be configured to hang on the user.

Fifth Embodiment

Figure 5A:
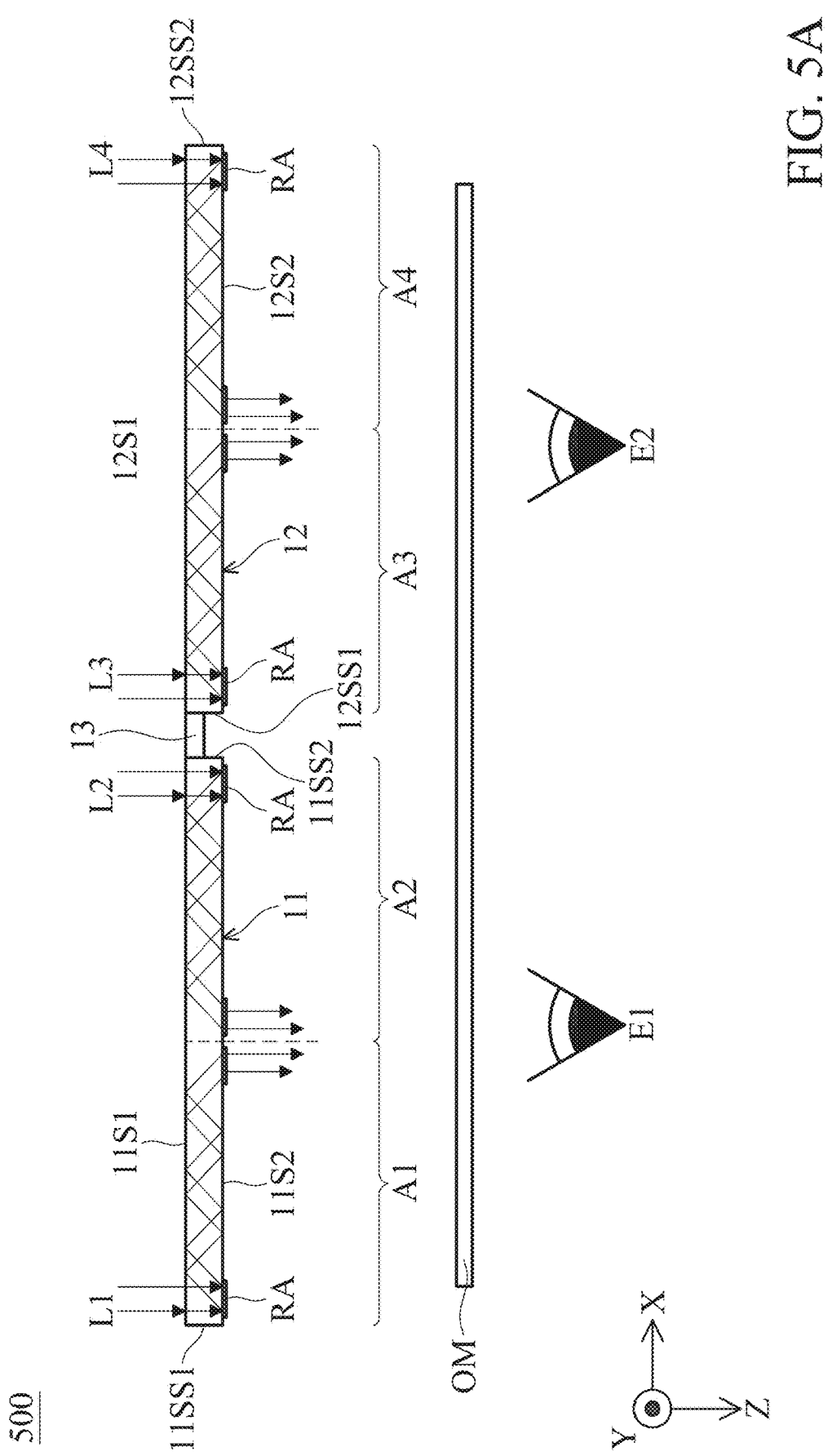
FIGS. 5A and 5B are schematic diagrams showing a wearable display device including an optical element according to another embodiment of the present invention.
Figure 5B:
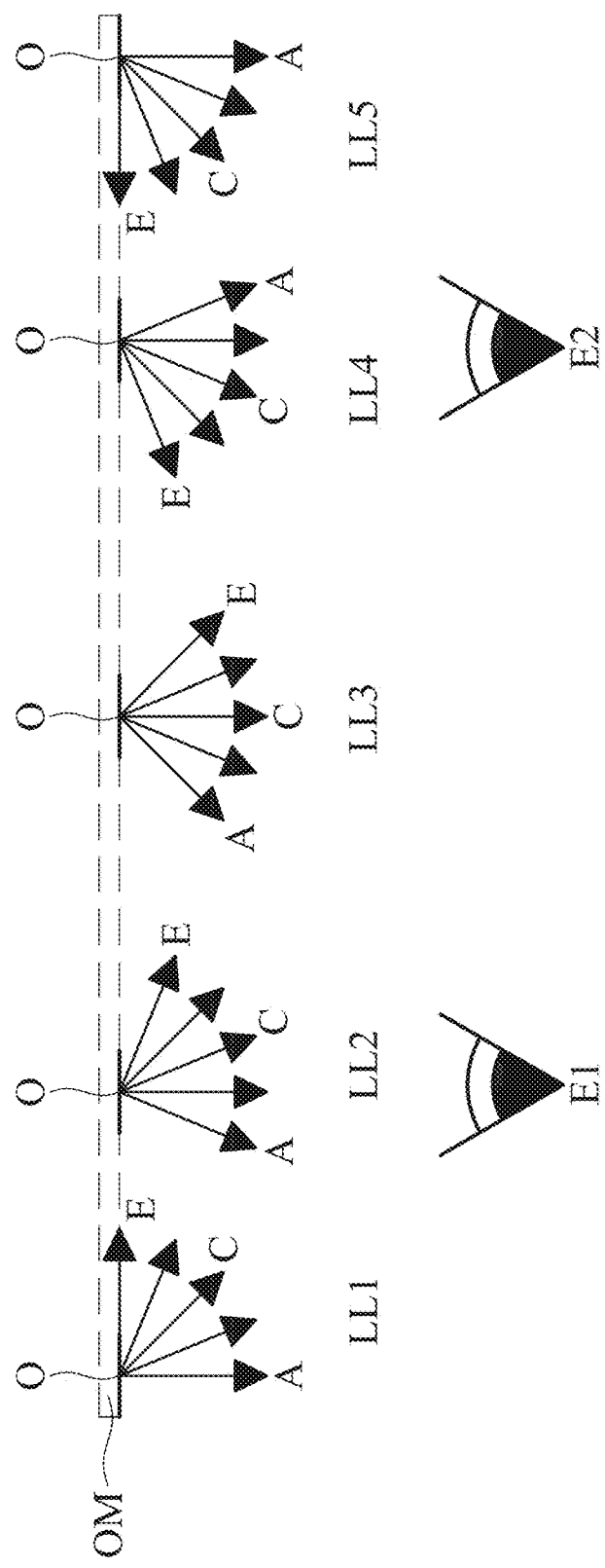

FIGS. 5A-5B show a wearable display device 500 according to another embodiment of the present invention. Compared with the wearable display device 100 of the first embodiment, the wearable display device 500 further includes an optical element OM disposed on the second sides 11S2 and 12S2 of the first and second optical waveguide lenses 11 and 12. The optical element OM may be a diffractive or holographic optical element, which is used to focus the lights L1, L2 from the light projectors P1 to P4 through the optical waveguide lenses 11 and 12 to the eyes E1, E2 of the user. Regarding the first optical waveguide lens 11 and the first projection assembly PA1 on the left half of the wearable display device 500, as shown in FIG. 5B, when the output first light L1 and second light L2 pass through the optical element OM, the first light L1 and the second light L2 are converged to the two eyes E1 and E2, and the lights passing through the optical element OM will have a field of view angle, namely ∠OAE, wherein $\overrightarrow{QC}$ is the center line of the field of view angle ∠OAE, which points to the eyes E1, E2, and the field of view angle ∠OAE of each of the lights at different positions on the optical element OM will rotate. For example, the light tilt angles of the diffraction/hologram at the leftmost and rightmost positions are the largest, that is, the leftmost edge $\overrightarrow{QE}$ and the rightmost edge $\overrightarrow{QA}$ become horizontal and the center line $\overrightarrow{QC}$ is tilted relative to the vertical direction; and closer to the center of the optical element OM, their $\overrightarrow{OC}$ directions are gradually closer to the vertical direction. The angle of views ∠OAE at different positions are overlap each other, which can provide a wider range of vision.

It should be understood that the output parts of the optical assemblies RA', RA" provided in the optical waveguide lenses in the FIGS. 1C-1D (that is, the gratings which finally reflects or diffracts light to the user's eyes), also can be a diffractive or holographic optical element, and the optical element OM in FIGS. 5A-5B has the function of rotating the field of view of the lights, so that the user can fully see images displayed on the optical waveguide lenses.

Sixth Embodiment

Figure 6:
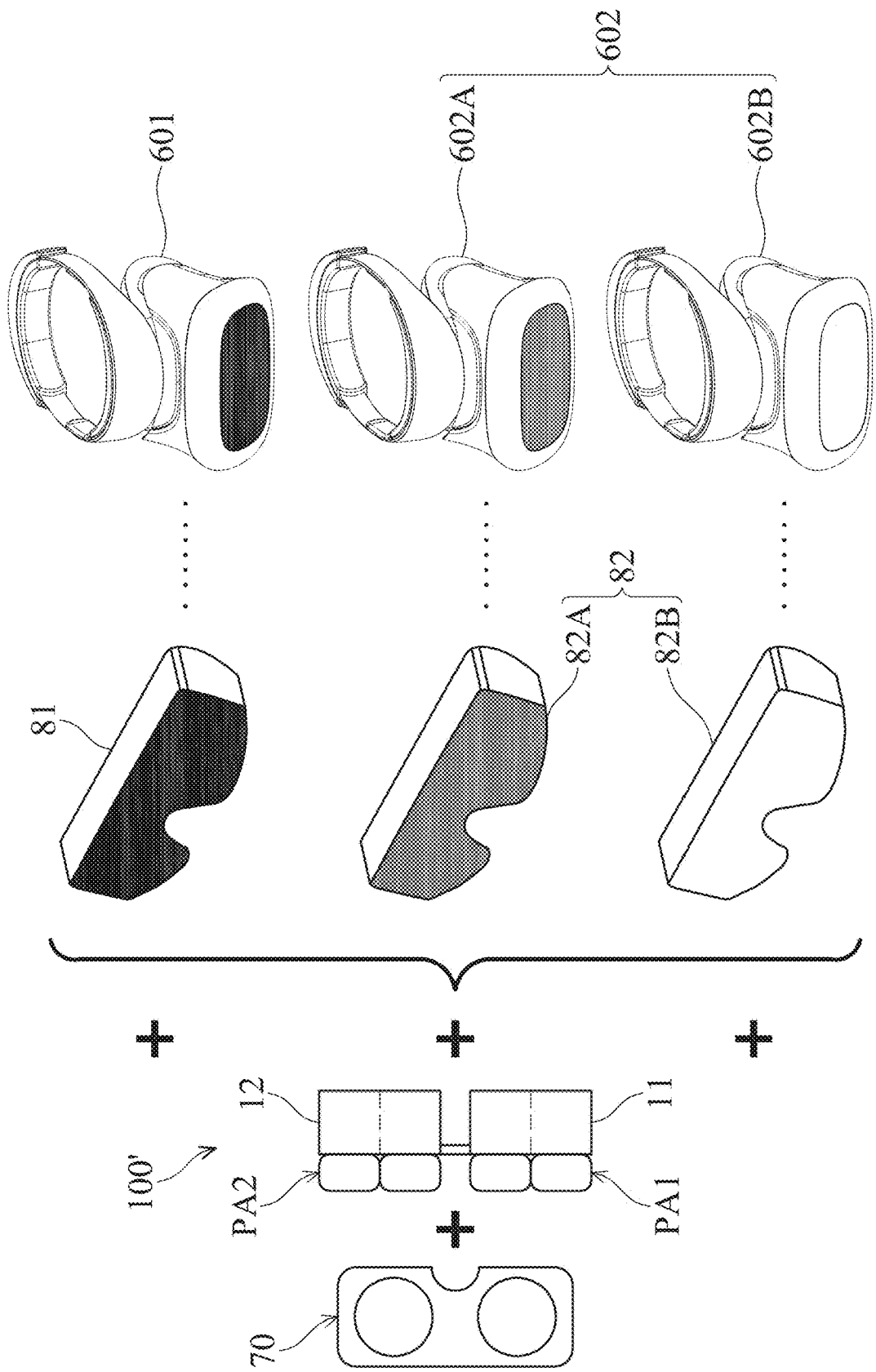
FIG. 6 is a schematic diagram showing a plurality of wearable display devices according to other embodiments of the present invention.

FIG. 6 shows a plurality of wearable display devices 601 and 602 according to another embodiment of the present invention. Compared to the wearable display device 100 shown in FIG. 1, these wearable display devices 601 and 602 further include a virtual reality (VR) lens 70 and a goggle shield (or eye shield) 81 (or 82). In some embodiments, a headband and outer protective members of the goggle shield 81 and 82 may be further included. The aforementioned virtual reality lens 70 is disposed on the first sides 11S1 and 12S2 of the first and second optical waveguide lenses 11 and 12 (that is, the side far from the eyes E1 and E2), and an amplification assembly 100' (as the wearable display device 100 in FIG. 1, including the virtual reality lens 70, the first and second projection assemblies PA1, PA2, the first and second optical waveguide lenses 11, 12, and a lens frame 13) which can be disposed within a goggle shield 81, 82.

The wearable display device 601 shown in FIG. 6 is equipped with an opaque goggle shield 81 and a virtual reality lens 70, so that it can be used as a full-dark VR device. The wearable display device 602 is equipped with a goggle shield 82 having polymer dispersed liquid-crystal (PDLC) material. The goggle shield 82 can be switched between a power-on mode and a power-off mode. Through the current switching between power on and power off, the visual area can be rendered transparent or matte state. When the goggle shield 82 is powered-off, the wearable display device 602 is in the power-off mode 602A, the goggle shield 82 presents a matte or an opaque state 82A, that is, the visual area of the goggle shield 82 presents a matte or an opaque surface, so that the device can be as a non-dark VR device; when the wearable display device 602 is in the power-on mode 602B, the goggle shield 82 is in a transparent state 82B, that is, the visual area of the goggle shield 82 presents a transparent surface, so that it can be used as an augmented reality display device. By switching the power-on and power-off modes, the wearable display device 602 can have more display functions.

As long as the features of the above embodiments do not violate the spirit of the disclosure of the present invention or conflict with each other, they can be mixed and used. In addition, in some embodiments, only one optical waveguide lens and one projection assembly in the wearable display device can correspond to one eye of the user to see the image displayed on the optical waveguide lens.

In summary, the present invention provides an electronic device, comprising a first optical waveguide lens and a first projection assembly. The first optical waveguide lens has a first area and a second area. The first projection assembly disposed on the first optical waveguide lens for projecting a plurality of lights and includes a first light projector and a second light projector. The first light projector and the second light projector are disposed in different positions on the first optical waveguide lens in the first direction, and the first light projector and the second light projector do not overlap in the second direction, wherein the first direction and the second direction are not parallel. The first light projector projects a first light to the first area, and the second light projector projects a second light to the second area, and the first light does not overlap with the second light in the second direction.

The embodiment of the present invention has at least one of the following advantages or effects. A plurality of light projectors are arranged on each light waveguide lens, and the light emitted by the light projector is projected on an independent area of the light waveguide lens and does not overlap to other areas, so that the display device can have a higher pixel density and provide a wider field of vision, greatly improving device quality and enriching user experience. In addition, in some embodiments, the display device further has an optical element, which can focus or converge the lights from the projector to the eyes of the user, and make the field of view of the light in the optical element wider, thereby providing a wider viewing area.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A wearable display device, comprising:
   a first optical waveguide lens, having a first area and a second area;
   a first projection assembly, configured to project a plurality of lights, that includes a first light projector and a second light projector; and
   an optical component, disposed on an output end of the first optical waveguide lens and inclined with respect to a surface of the first optical waveguide lens;
   wherein the first light projector and the second light projector are disposed in different positions in a first direction, the first light projector is disposed on the first optical waveguide lens, and the first light projector and the second light projector do not overlap in a second direction, wherein the first direction and the second direction are not parallel;
   wherein the first light projector projects a first light to the first area, and the second light projector projects a second light to the second area, and the first light does not overlap with the second light in the second direction.

2. The wearable display device as claimed in claim 1, further comprising:

a second optical waveguide lens, adjacent to the first optical waveguide lens, and having a third area and a fourth area; and a second projection assembly, disposed on the second optical waveguide lens and including a third light projector and a fourth light projector;

wherein the third light projector and the fourth light projector are respectively disposed in different positions of the second optical waveguide lens in the first direction, and the third light projector and the fourth light projector do not overlap in the second direction;

wherein the third light projector projects a third light to the third area, the second light projector projects a fourth light to the fourth area, and the third light and the fourth light do not overlap in the second direction.

3. The wearable display device as claimed in claim 1, wherein the first projection assembly further includes a third light projector, and the first optical waveguide lens further includes a third area, wherein the third light projector projects a third light to the third area, and the first, second, and third lights do not overlap each other in the second direction.

4. The wearable display device as claimed in claim 1, further comprising a connecting line assembly disposed on the first optical waveguide lens, and the connecting line assembly connects the first optical waveguide lens and the second light projector.

5. The wearable display device as claimed in claim 1, further comprising another optical component disposed on the first optical waveguide lens, wherein when the lights are emitted from the first projection assembly to the first optical waveguide lens, the lights are reflected or diffracted via the another optical component in the first optical waveguide lens.

6. The wearable display device as claimed in claim 5, wherein the another optical component is inclined relative to a surface of the first optical waveguide lens.

7. The wearable display device as claimed in claim 1, further comprising an optical element disposed on a side of the first optical waveguide lens, wherein when the plurality of lights emitted by the first projection assembly sequentially pass through the first waveguide lens and the optical element, the optical element enables each light to have a viewing angle on the optical element, and the lights overlap each other.

8. The wearable display device as claimed in claim 1, further comprising a virtual reality lens and a goggle shield, wherein the virtual reality lens is disposed on a side of the first waveguide lens, and the virtual reality lens, the first waveguide lens and the first light projection assembly are disposed in the goggle shield.

9. The wearable display device as claimed in claim 8, wherein a visual area of the goggle shield has an opaque material.

10. The wearable display device as claimed in claim 8, wherein the visual area of the goggle shield has a polymer dispersed liquid-crystal material, and the goggle shield can be switched between a power-off mode and a power-on mode, wherein when the goggle shield is in the power-off mode, the visual area presents a matte surface, and when the goggle shield is in the power-on mode, the visual area presents a transparent surface.

11. The wearable display device as claimed in claim 1, wherein the first light and the second light are output at different positions of the first optical waveguide lens.

12. The wearable display device as claimed in claim 1, wherein the optical component is rotatably disposed on the first optical waveguide lens, to adjust an output angle of the first light and an output angle of the second light.

* * * * *